US011305867B2

(12) United States Patent
Schroeder et al.

(10) Patent No.: US 11,305,867 B2
(45) Date of Patent: Apr. 19, 2022

(54) FITTING PROVIDING MOTOR STRUCTURE AND STATOR SUPPORT

(71) Applicant: Bell Textron Inc., Fort Worth, TX (US)

(72) Inventors: Karl Schroeder, Southlake, TX (US); Christopher Marion Johnson, Fort Worth, TX (US); Joseph Richard Carpenter, Jr., Kennedale, TX (US); David G. Carlson, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 342 days.

(21) Appl. No.: 16/679,117

(22) Filed: Nov. 8, 2019

(65) Prior Publication Data

US 2021/0139131 A1     May 13, 2021

(51) Int. Cl.
*B64C 11/02*      (2006.01)
*B64C 29/00*      (2006.01)
*B64C 7/00*       (2006.01)

(52) U.S. Cl.
CPC ................ *B64C 11/02* (2013.01); *B64C 7/00* (2013.01); *B64C 29/0033* (2013.01)

(58) Field of Classification Search
CPC ........... B64C 11/02; B64C 11/04; B64C 7/00; B64C 7/02; B64C 29/0033; F02C 7/06; F01D 25/16; F01D 25/162; F01D 25/164
See application file for complete search history.

(56) References Cited

U.S. PATENT DOCUMENTS

| 5,498,129 A * | 3/1996 | Dequin | B64C 27/82 244/17.19 |
|---|---|---|---|
| 6,837,757 B2 * | 1/2005 | Van Dine | B63H 23/24 310/87 |
| 2017/0166304 A1 * | 6/2017 | Erdozain, Jr. | B64C 39/024 |
| 2021/0107664 A1 * | 4/2021 | Rabbi | H02K 7/14 |

* cited by examiner

*Primary Examiner* — Woody A Lee, Jr.
*Assistant Examiner* — Elton K Wong
(74) *Attorney, Agent, or Firm* — Lightfoot & Alford PLLC

(57) ABSTRACT

A hub assembly for a ducted-rotor aircraft includes a plurality of stator supports, a first integral fitting that attaches to first ends of the stator supports, and a second integral fitting that attaches to second ends of the stator supports. The first fitting includes a plurality of motor attachment portions configured to locate and support a motor of the ducted-rotor aircraft, a plurality of fairing mounts configured to support attachment of an aerodynamic fairing to the hub assembly, and a plurality of stator locators configured to locate respective ones of the plurality of stator supports for attachment to the hub assembly. The first fitting has a body portion with an annular wall that supports the motor attachment portions, the fairing mounts, and the stator locators. The first fitting may be fabricated as a monolith that includes the body portion, motor attachment portions, fairing mounts, and stator locators.

20 Claims, 16 Drawing Sheets

FITTING PROVIDING MOTOR STRUCTURE AND STATOR SUPPORT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Ducted-rotor aircraft have at least one ducted rotor for providing lift and propulsion forces. Each ducted rotor typically has a central hub. The hub provides structural support for mounting a motor and facilitates the attachment of other ducted-rotor components to the hub such as an aerodynamic exterior skin and a plurality of stators. It is desirable to minimize the number of separate components within the hub, not only to limit the weight of the hub, but further to limit the number of joints that might be stressed during operation of the aircraft.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A hub assembly that includes upper and lower integral fittings is disclosed herein for use in aircraft such as ducted-rotor aircraft.

Figure 1:
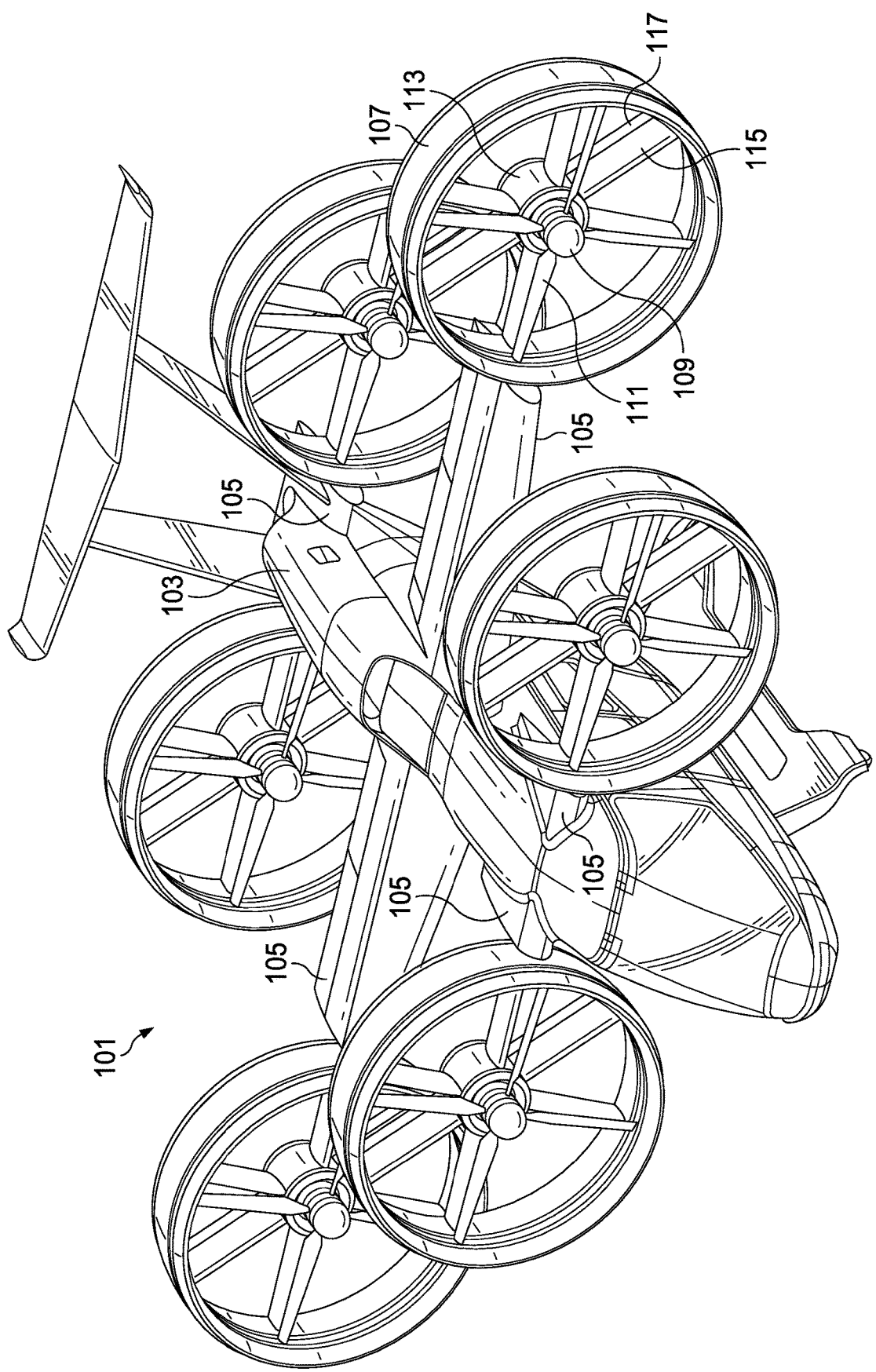
FIG. 1 is an oblique view of an aircraft with ducted rotors.

FIG. 1 is an oblique view of a ducted-rotor aircraft 101. Aircraft 101 comprises a fuselage 103 with a plurality of fixed wings 105 extending therefrom and a plurality of pivotable ducts 107. As shown, a duct 107 is located at an end of each wing 105. Each duct 107 houses a powerplant for driving an attached rotor 109 in rotation. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in airplane mode, which allows for high-speed forward-flight. Ducts 107 are repositionable to convert aircraft 101 into helicopter mode (not shown), which allows for vertical takeoff and landing, hovering, and low-speed directional movement.

Each duct 107 includes a central hub 113 that is configured to receive a rotor 109 and/or other components. Each duct 107 further includes a plurality of stators 115 that extend outwardly from the hub 113. Each duct 107 includes six stators 115 that extend radially outward from hub 113. As shown, stators 115 are unequally spaced about hub 113. It should be appreciated that duct 107 may be alternatively configured with more or fewer stators 115. It should further be appreciated that duct 107 may be alternatively configured with different spacing of stators 115 about hub 113. Duct 107 further includes vanes 117 that are pivotally attached to respective stators 115, such that vanes 117 may be rotated to facilitate changes of direction, turning, etc. during flight of aircraft 101.

Figure 2:
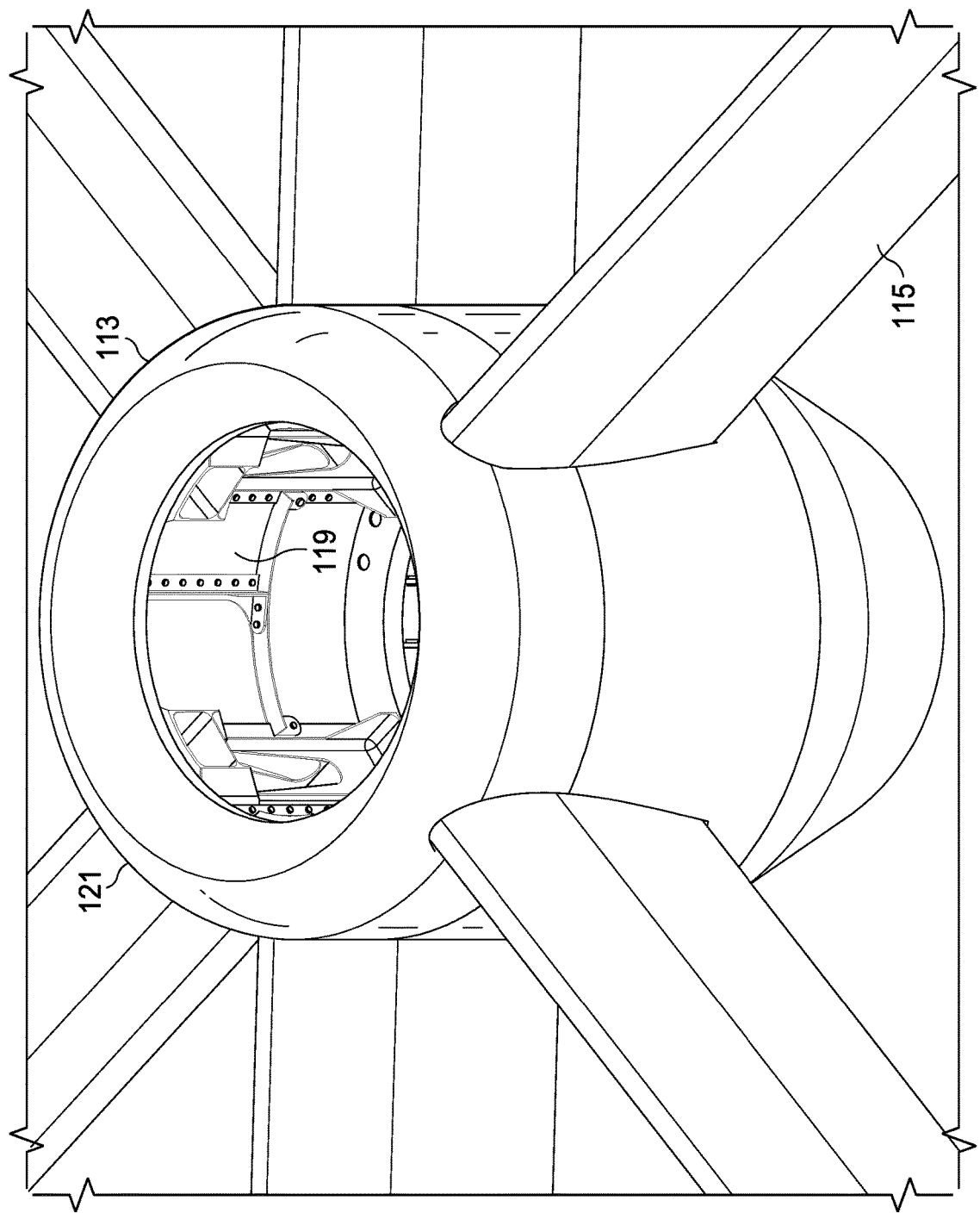
FIG. 2 is an oblique view of a duct of the aircraft depicted in FIG. 1.

FIG. 2 is an oblique view of a portion of a duct 107 of aircraft 101. As shown in FIG. 2, duct 107 is depicted with rotor 109 removed, exposing an inner hub assembly 119 of duct 107. Duct 107 may include one or more sections of aerodynamic fairing 121 that enclose hub assembly 119 and form an outer skin of duct 107.

Figure 3A:
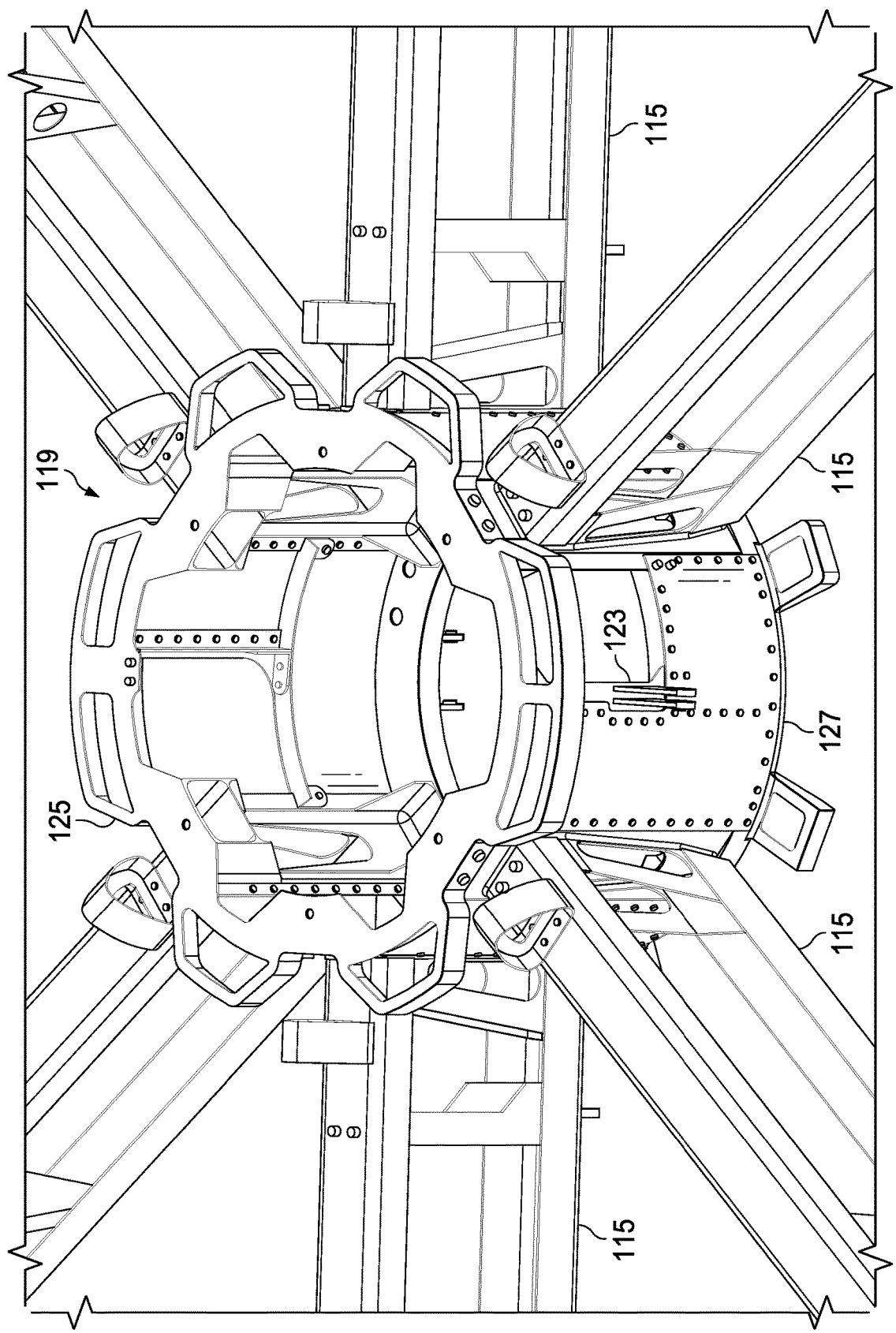
FIG. 3A is an oblique view of the duct depicted in FIG. 2, with exterior fairing removed to expose a hub assembly of the duct and stators that are attached to the hub assembly.
Figure 3B:
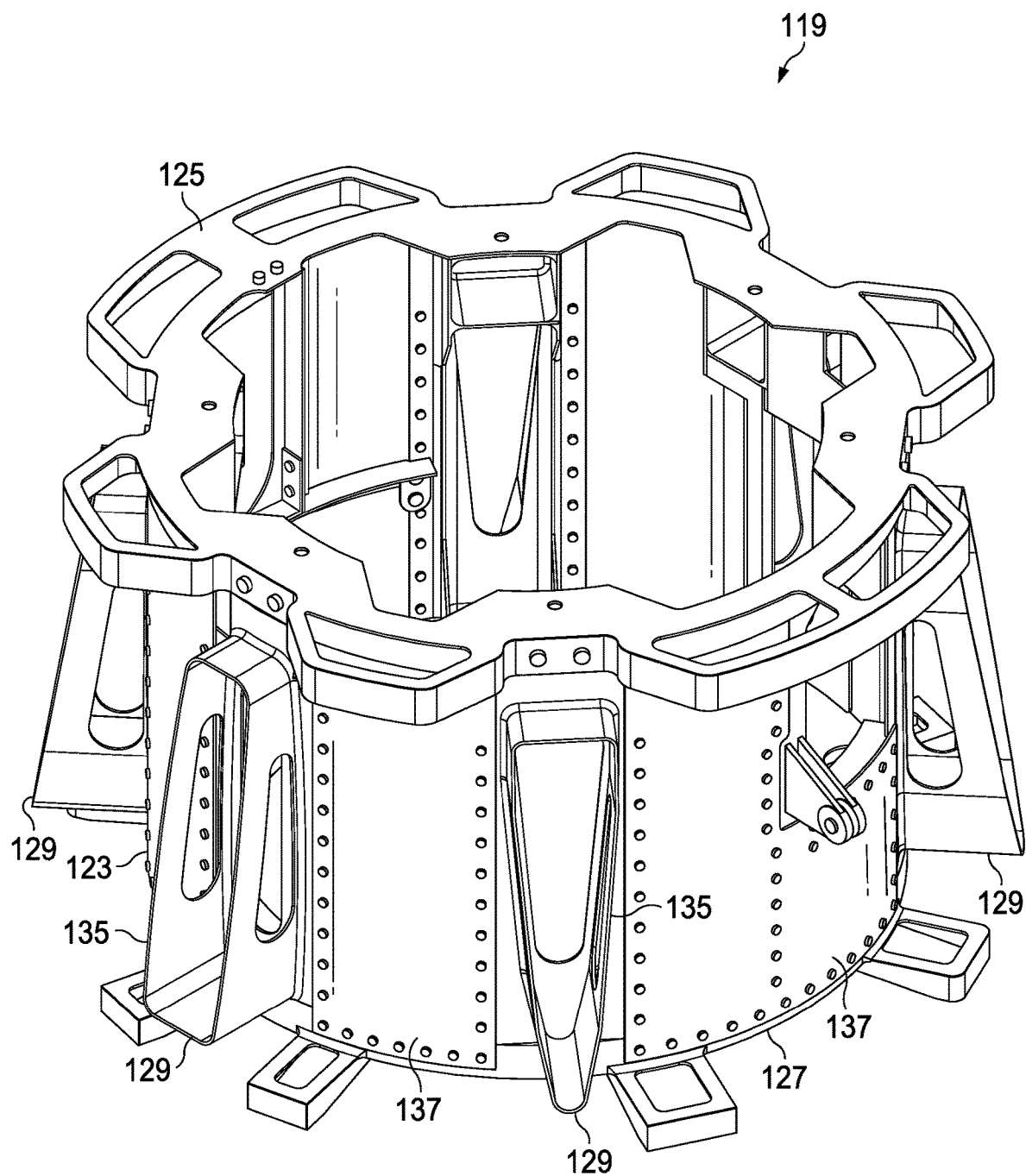
FIGS. 3B and 3C are oblique views of the duct assembly depicted in FIG. 3A, with the stators removed.
Figure 3C:
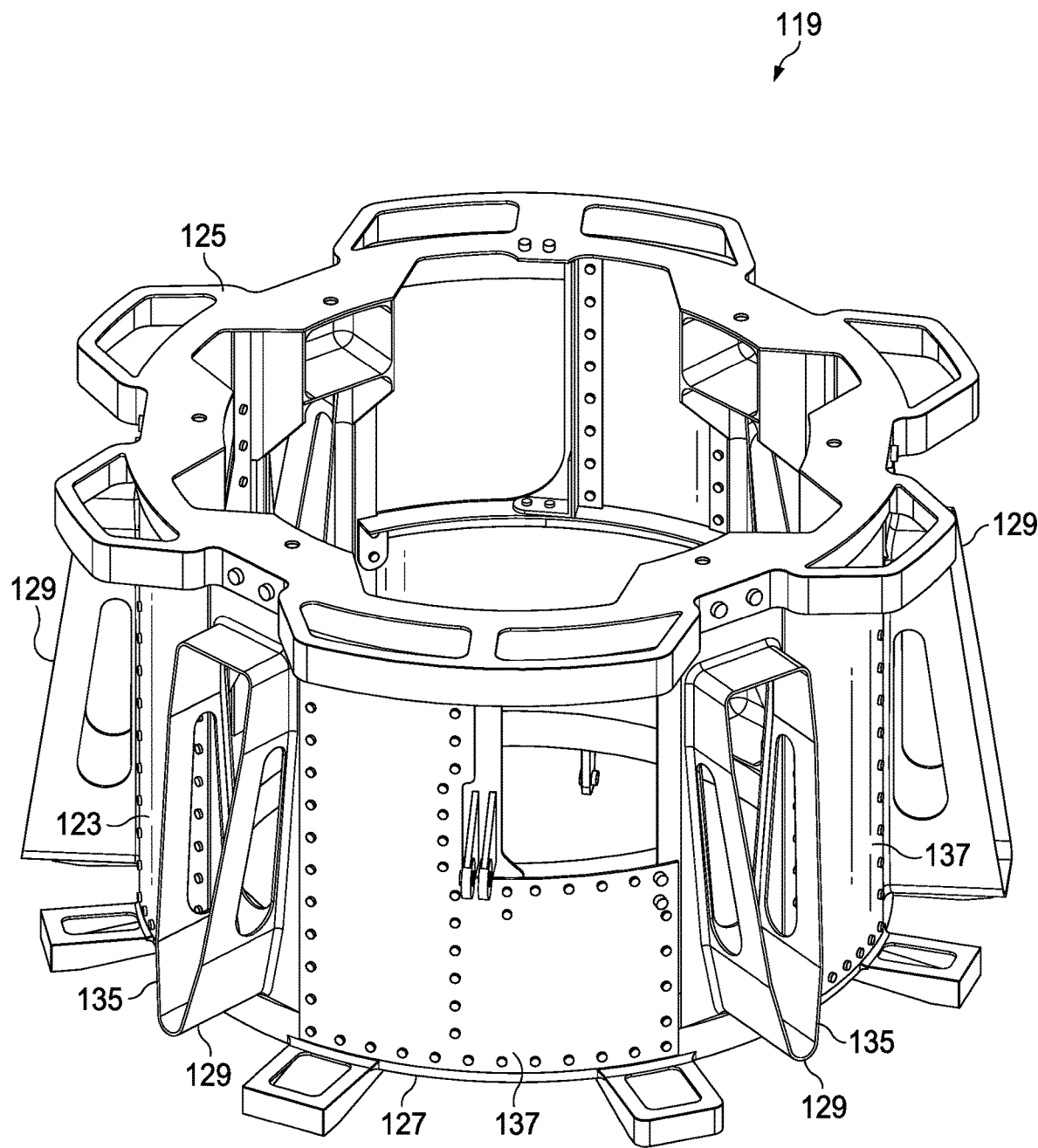
Figure 3D:
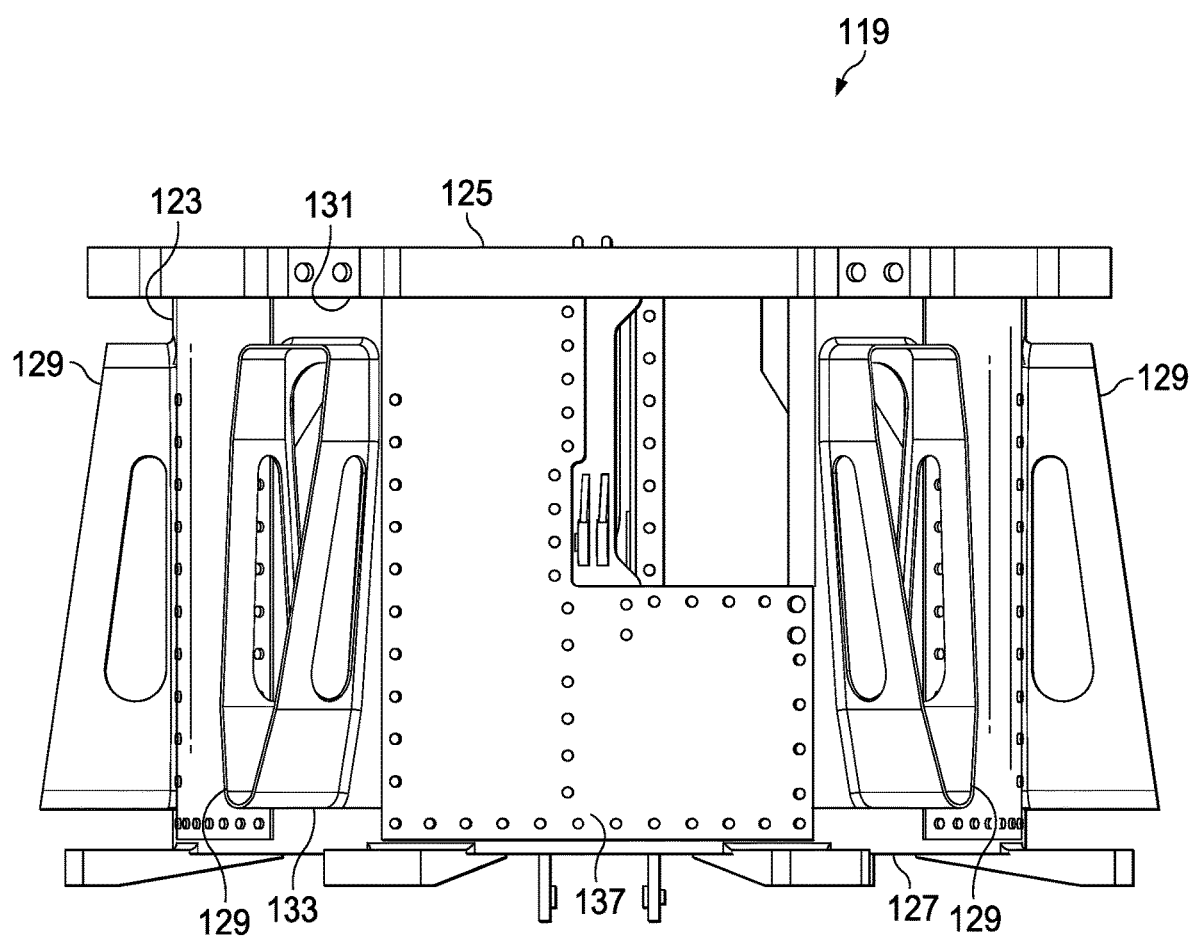
FIGS. 3D and 3E are side views of the duct assembly depicted in FIG. 3A, with the stators removed.
Figure 3E:
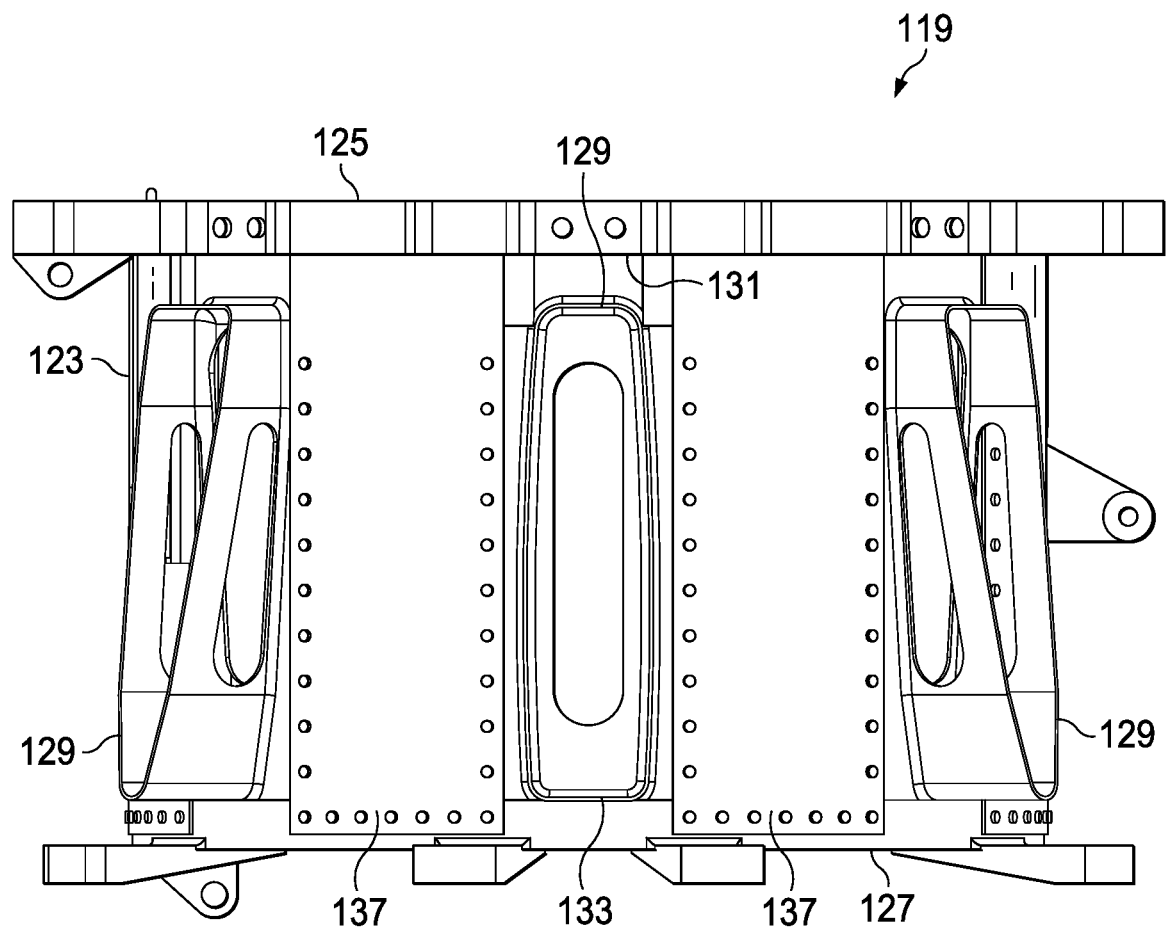
Figure 4A:
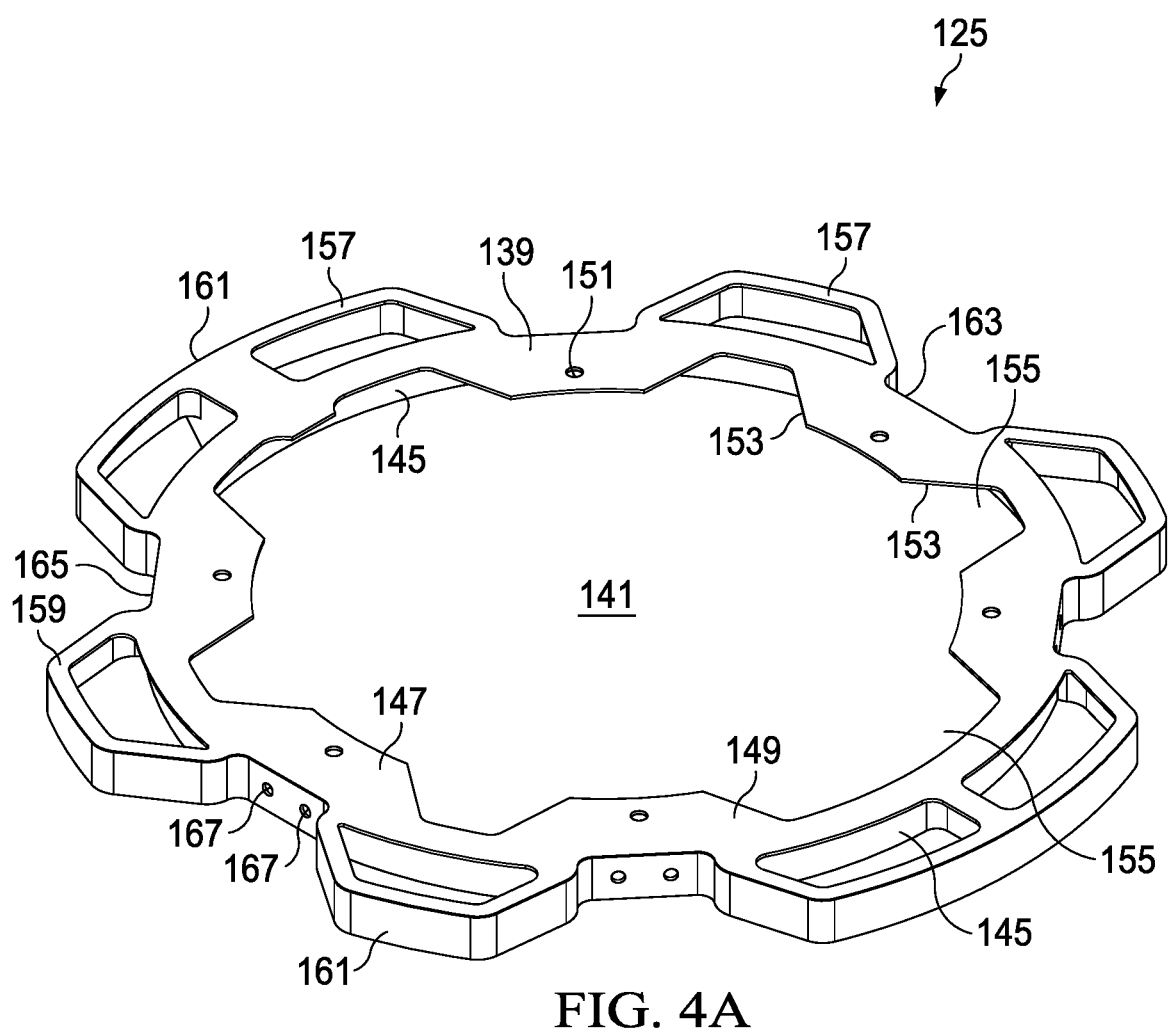
FIG. 4A is an oblique view of a first fitting component of the hub assembly depicted in FIGS. 3A-3E.
Figure 4B:
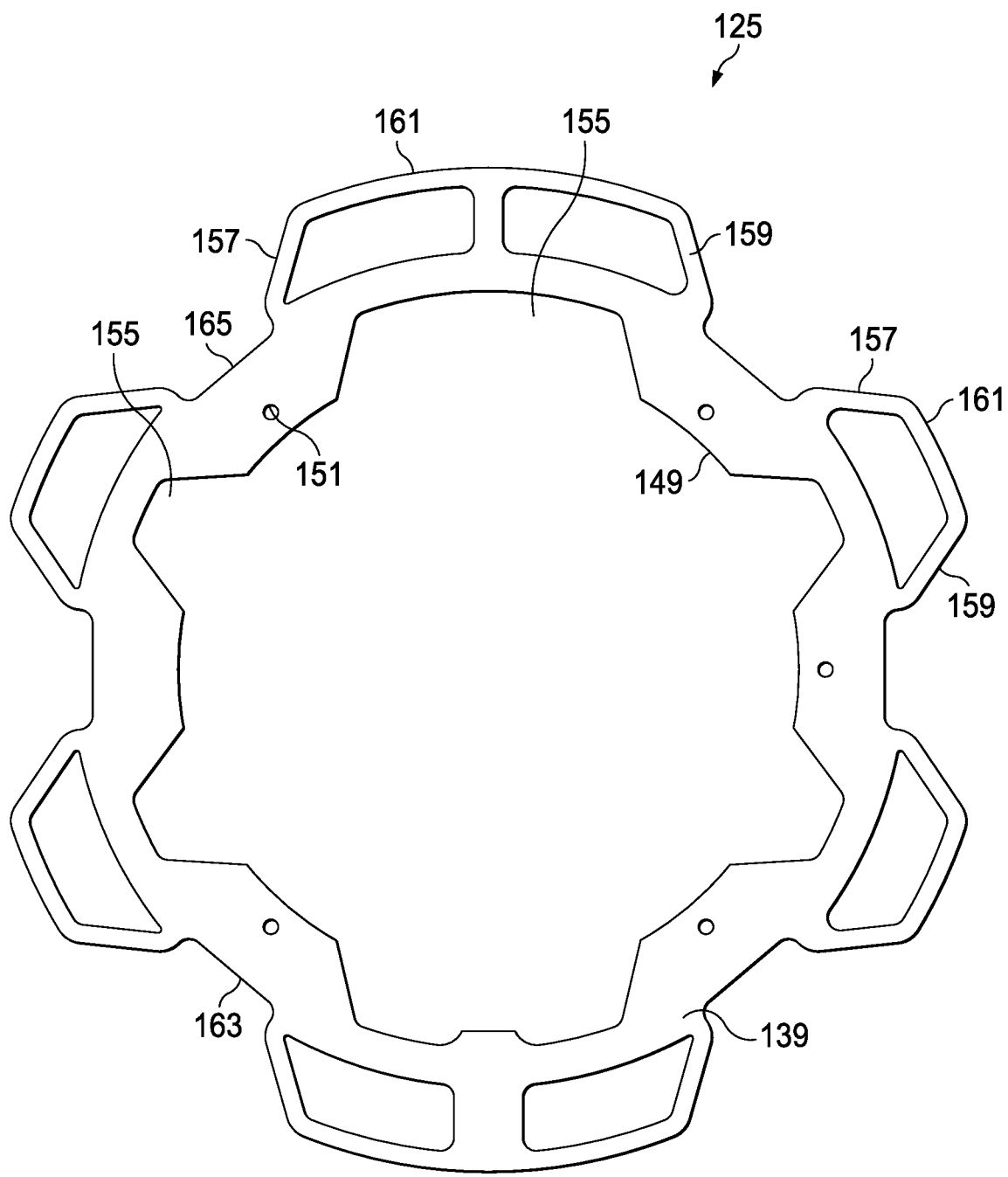
FIG. 4B is a top view of the first fitting depicted in FIG. 4A.
Figure 4C:
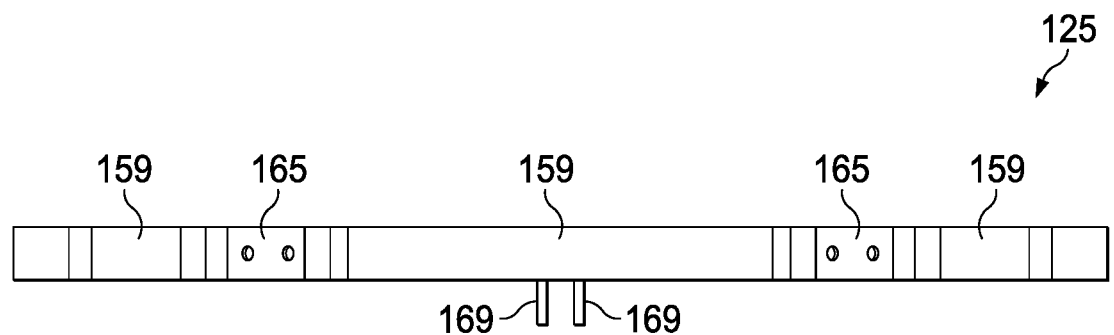
FIGS. 4C and 4D are side views of the first fitting depicted in FIG. 4A.
Figure 4D:
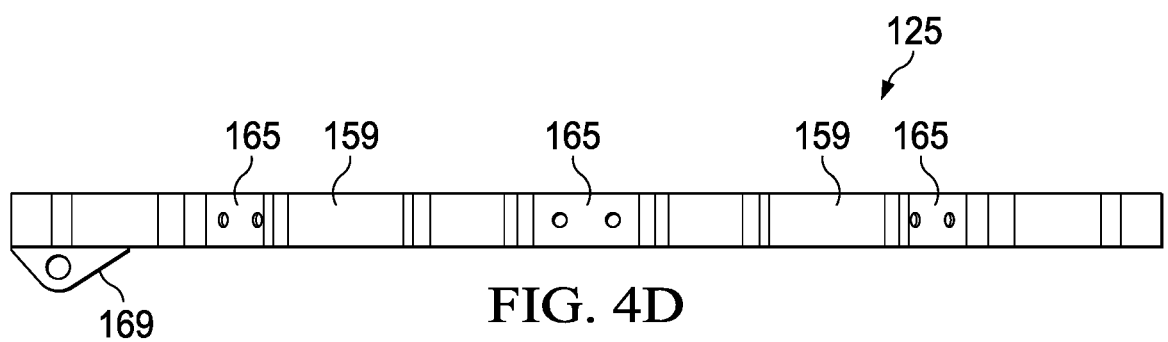
Figure 5A:
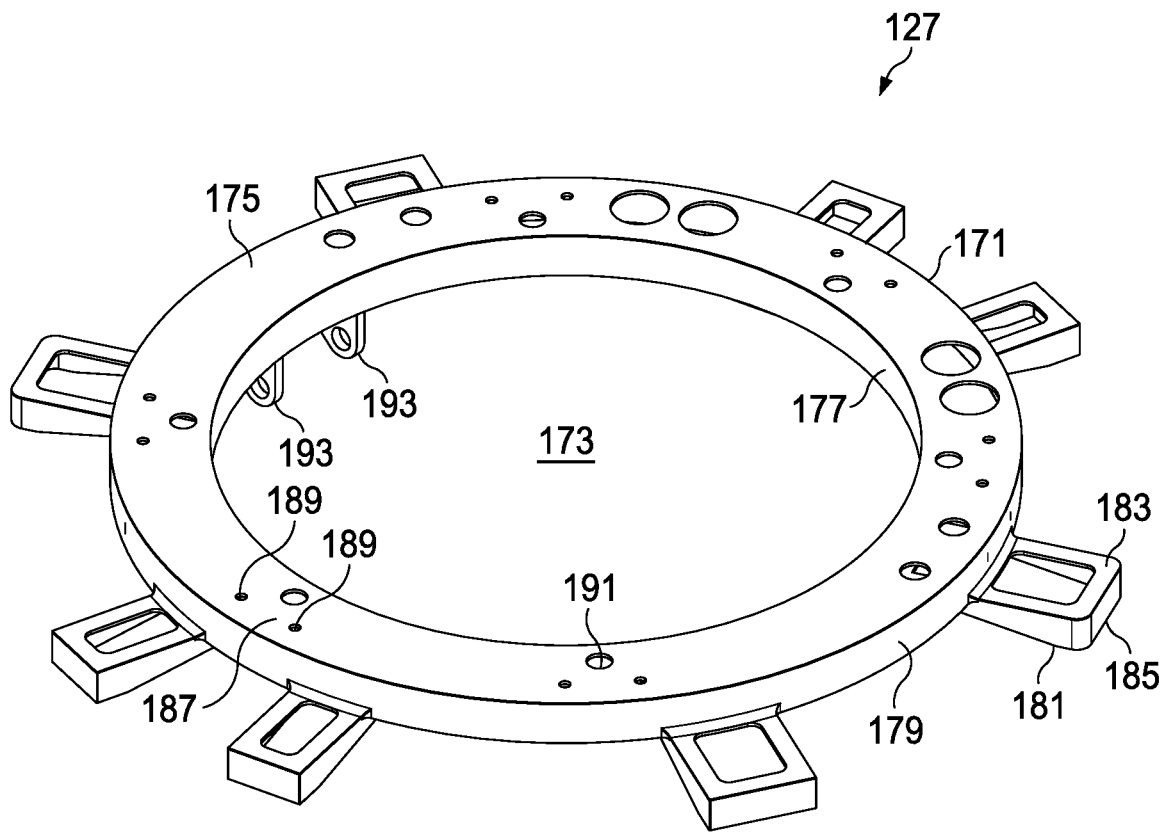
FIG. 5A is an oblique view of a second fitting component of the hub assembly depicted in FIGS. 3A-3E.
Figure 5B:
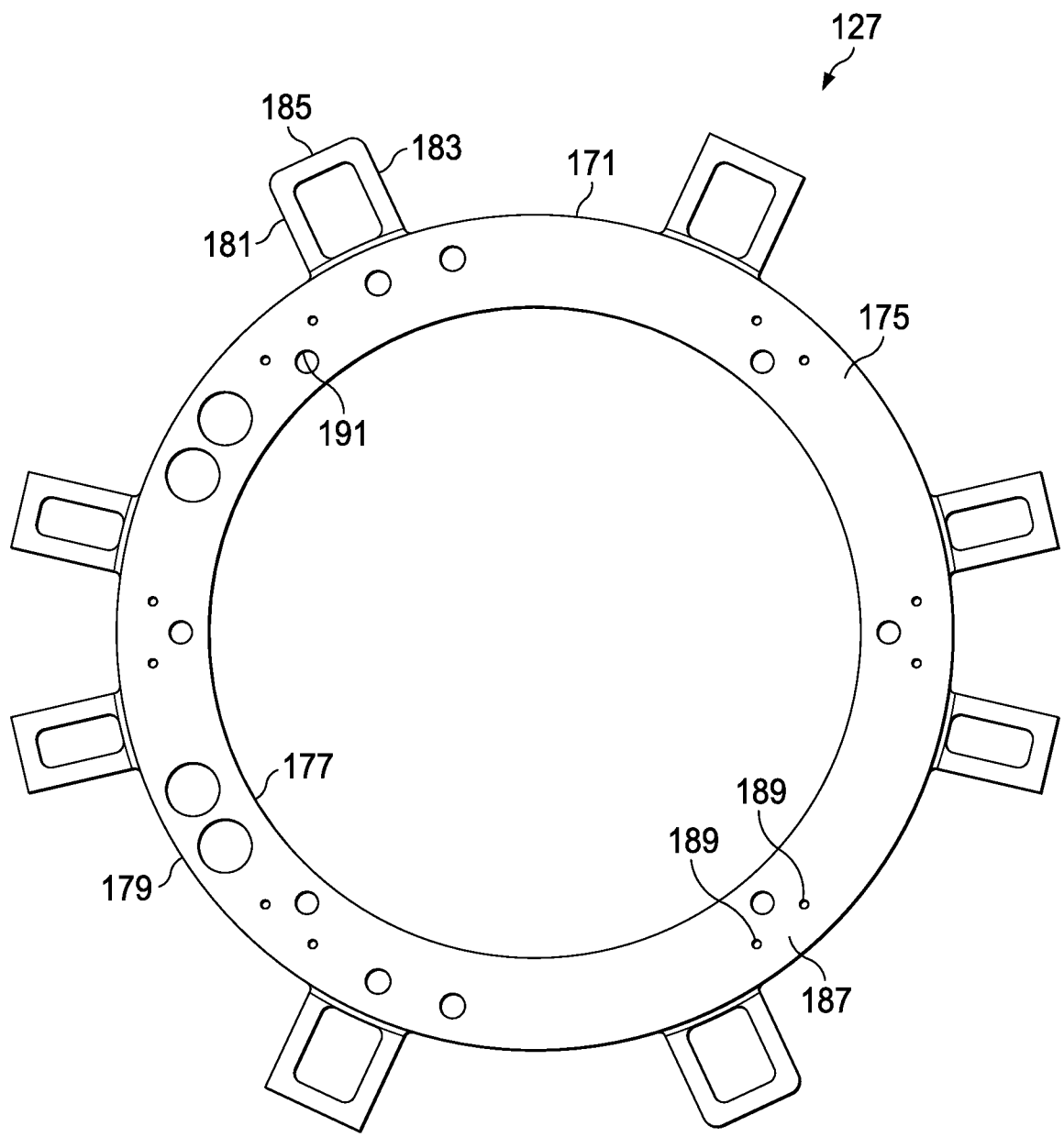
FIG. 5B is a top view of the first fitting depicted in FIG. 5A.
Figure 5C:
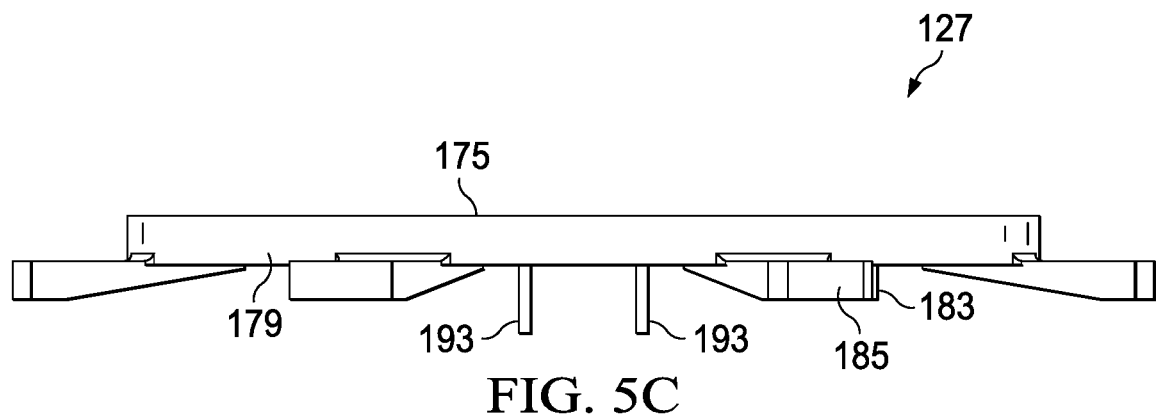
FIGS. 5C and 5D are side views of the first fitting depicted in FIG. 5A.
Figure 5D:
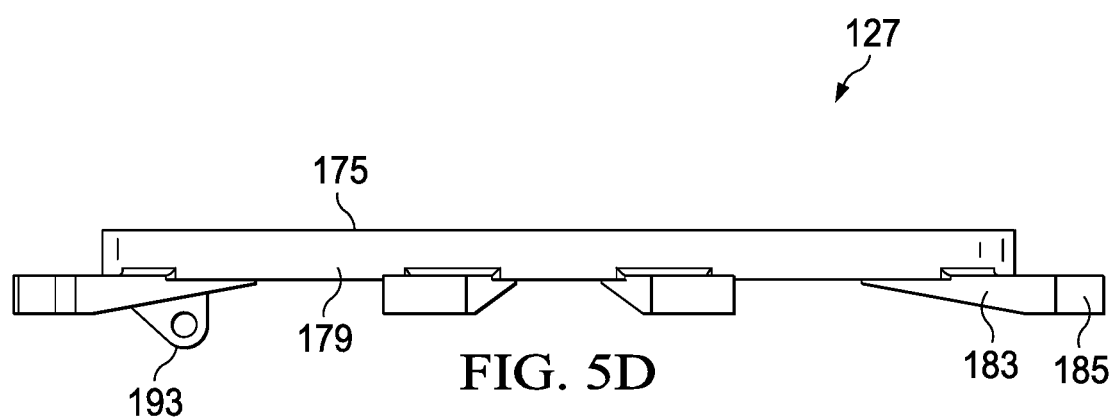

FIGS. 3A-3E illustrate various views of hub assembly 119. FIG. 3A illustrates hub 113 with fairing 121 removed to illustrate hub assembly 119 with stators 115 attached. As shown, hub assembly 119 includes a core 123, a first fitting 125 disposed at an upper end of core 123, and a second fitting 127 disposed at an opposed lower end of core 123. FIGS. 3B-3E illustrate hub assembly 119 with fairing 121 and stators 115 removed.

As shown, core 123 includes six stator supports 129. Each stator support 129 is configured to support and facilitate attachment of a corresponding stator 115 to hub 113. Each stator support 129 defines a first end 131, an opposed second end 133, and an insert 135 that is configured to be received in an end of a corresponding stator 115. Each stator 115, once disposed onto a corresponding insert 135, may be attached to insert 135 and thus to hub assembly 119, for example using fasteners. First end 131 of each stator support 129 is configured to facilitate attachment to first fitting 125. Second end 133 of each stator support 129 is configured to facilitate attachment to second fitting 127. In this embodiment, each stator support 129 is fabricated as a single-piece component.

As shown, not all stator supports 129 define inserts 135 having the same geometry. For example, stators 115 may have any combination of the same or different cross-sectional profiles, and stator supports 129 may accordingly define inserts 135 having respective geometries that are the same or different relative to one another. Stator supports 129 may be fabricated from steel or any other suitable material.

Core 123 further includes a plurality of wall portions 137 that extend between sides of adjacent stator supports 129. Wall portions 137 are attached to stator supports 129, and may further be attached to one or both of first fitting 125 and second fitting 127. As shown, wall portions 137 comprise arc-shaped plates, such that core 123, when assembled, is substantially cylindrical in shape. It should be appreciated, however, that one or more components of core 123, such as stator supports 129 and/or wall portions 137, may be alternatively configured such that core 123 exhibits a shape other than cylindrical when assembled. It should further be appreciated that duct 107 may be alternatively configured with more or fewer stators 115 such that core 123 may include more or fewer stator supports 129 and more or fewer corresponding wall portions 137.

Figure 6A:
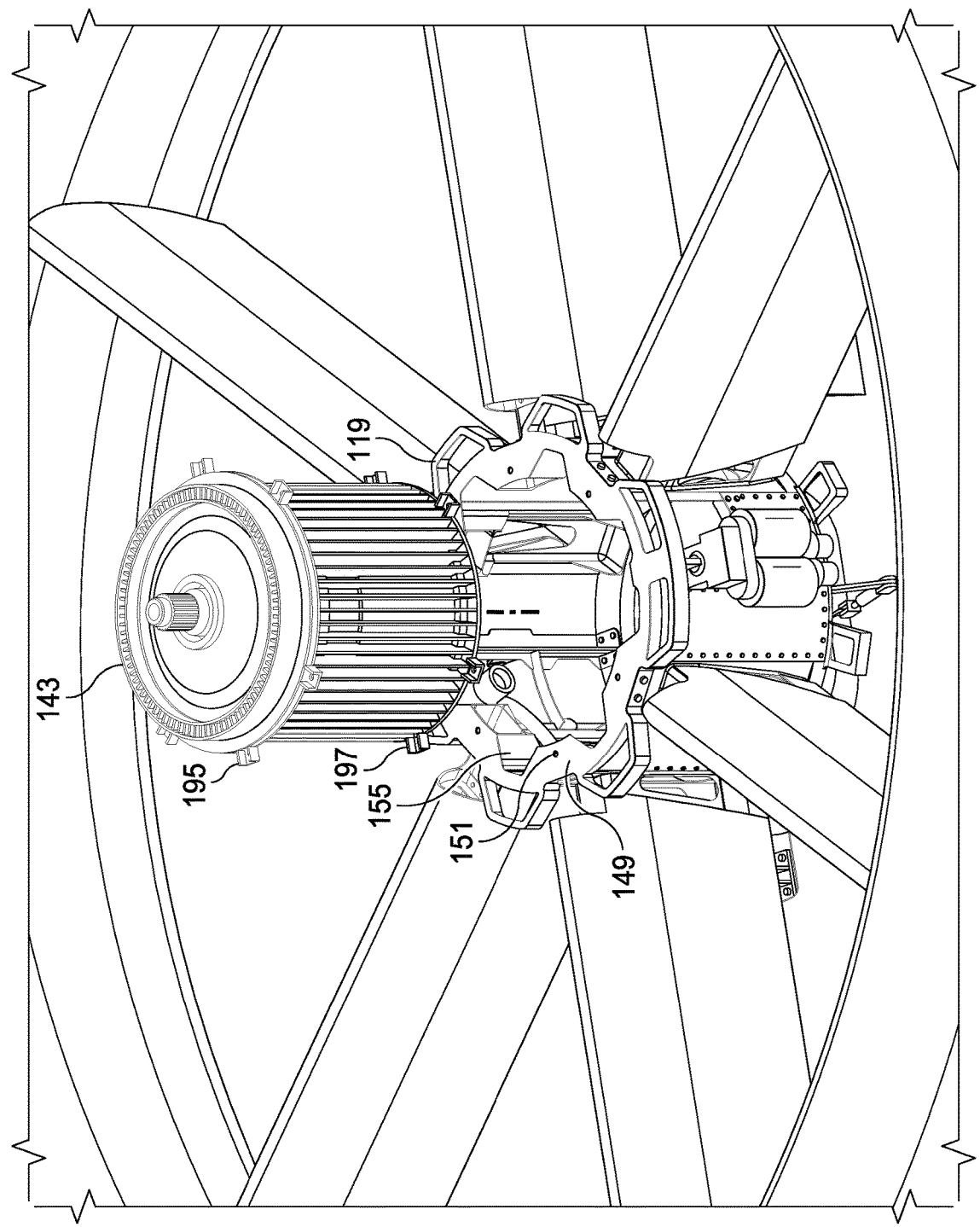
FIGS. 6A and 6B are oblique views depicting the installation of a motor into the hub assembly depicted in FIGS. 3A-3E.
Figure 6B:
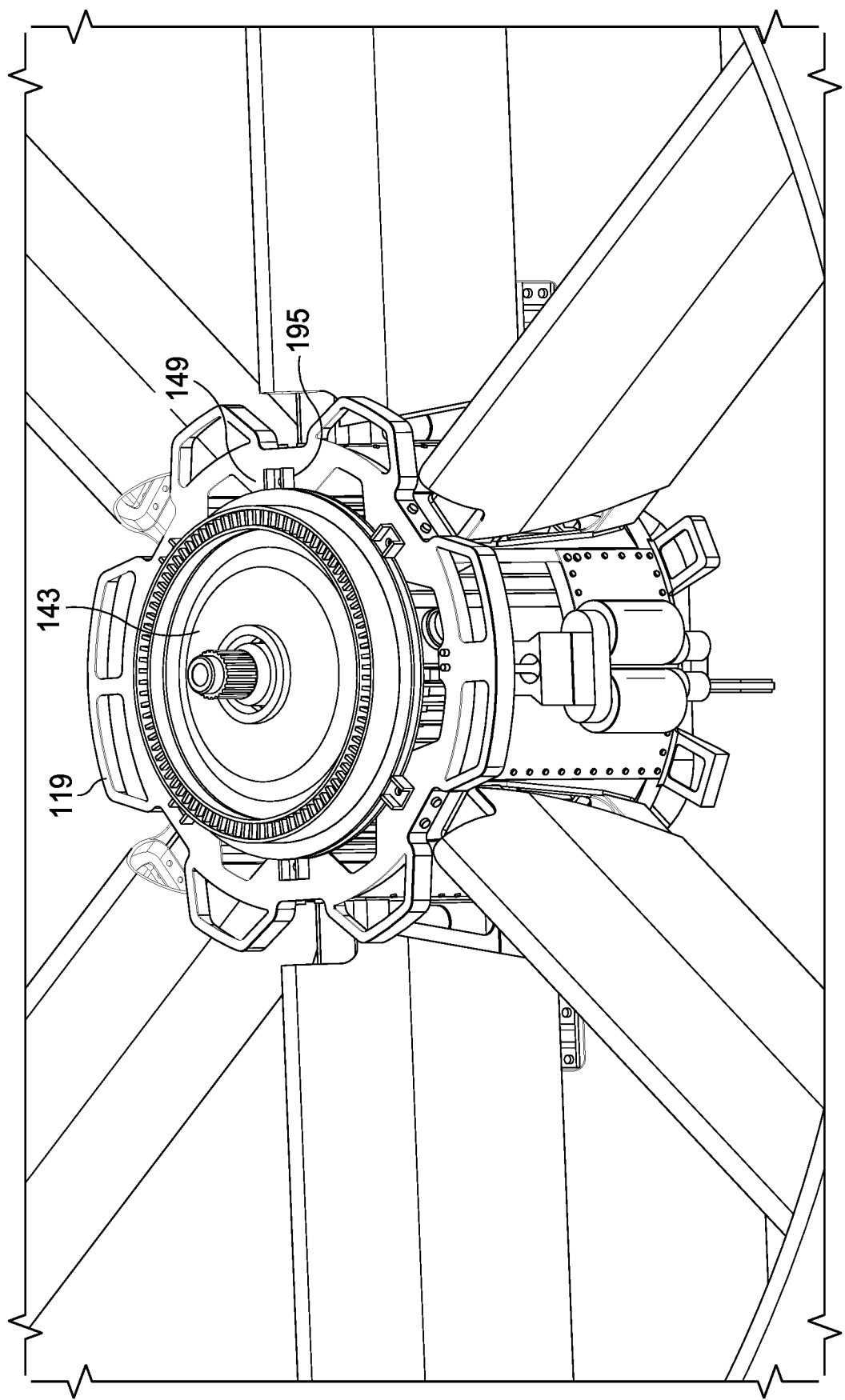

FIGS. 4A-4D illustrate various views of first fitting 125. First fitting 125 includes a body portion 139 that defines an opening 141 that extends therethrough. Opening 141 is configured to receive a motor 143, for example as depicted in FIGS. 6A-6B. With continued reference to FIGS. 4A-4D, as shown body portion 139 has an annular wall 145 that extends around a perimeter of first fitting 125.

First fitting 125 includes a plurality of motor attachment portions 147. Motor attachment portions 147 are configured both to locate an installed position of motor 143 relative to first fitting 125 and to facilitate fixed attachment of motor 143 to first fitting 125. With motor 143 attached to motor attachment portions 147, first fitting 125 at least partially supports motor 143 within hub assembly 119. As shown, motor attachment portions 147 comprise respective protrusions, in the form of tabs 149, that extend inward into opening 141 from an upper end of wall 145. In this regard, motor attachment portions 147 are supported by wall 145. Tabs 149 may be configured such that complementary attachment features of motor 143 can be attached securely to tabs 149. In this embodiment, each tab 149 defines an aperture 151 that extends therethrough. Each aperture 151 is configured to receive a fastener to secure a portion of motor 143 to first fitting 125.

Each tab 149 has sides 153 that taper inward from wall 145. The geometry of tabs 149 defines respective keyed gaps 155 between adjacent tabs 149. Keyed gaps 155 facilitate insertion of motor 143 into hub assembly 119, as described elsewhere herein. It should be appreciated that in alternative embodiments, motor attachment portions 147 can be configured with tabs having different geometries as compared to tabs 149. It should further be appreciated that motor attachment portions 147 are not limited to the illustrated implementation as tabs, and may be alternatively implemented to otherwise positionally locate motor 143 relative to first fitting 125, provide support of motor 143, and/or facilitate attachment of motor 143 to first fitting 125.

First fitting 125 further includes a plurality of fairing mounts 157. Fairing mounts 157 are configured to facilitate attachment of fairing 121 to hub assembly 119. As shown, fairing mounts 157 comprise respective projections, in the form of ribs 159, that extend outward from an outer surface of wall 145. In this regard, fairing mounts 157 are supported by wall 145. Ribs 159 may be configured such that respective portions of fairing 121 can be attached to ribs 159. In this embodiment, each rib 159 defines an arc-shaped outer surface 161 that is configured to abut a corresponding portion of an inner surface of fairing 121, thereby providing an attachment surface for securing fairing 121 to hub assembly 119. It should be appreciated that in alternative embodiments, fairing mounts 157 can comprise ribs having different geometries as compared to ribs 159. It should further be appreciated that fairing mounts 157 are not limited to implementation as ribs and may be alternatively implemented to otherwise facilitate attachment of fairing 121 to first fitting 125.

First fitting 125 further includes a plurality of stator locators 163. Each of the stator locators 163 is configured to locate the first end 131 of a respective stator support 129 for attachment to hub assembly 119. As shown, each stator locator 163 comprises a recess 165 that extends into the outer surface of wall 145. In this regard, stator locators 163 are supported by wall 145. Each recess 165 may be configured such that complementary attachment features of stator support 129 can be attached securely to first fitting 125 within recess 165. In this embodiment, each recess 165 defines a pair of apertures 167 that extend through wall 145. Each aperture 167 is configured to receive a fastener to attach the first end 131 of a corresponding stator support 129 to first fitting 125. As shown, each recess 165 is radially aligned with a corresponding tab 149, such that aperture 151 is located between a corresponding pair of apertures 167. It should be appreciated that in alternative embodiments, stator locators 163 can comprise recesses having different geometries as compared to recesses 165. It should further be appreciated that stator locators 163 are not limited to implementation as recesses and may be alternatively implemented to otherwise facilitate attachment of stator supports 129 to first fitting 125.

First fitting 125 may be fabricated from steel or any other suitable material. As shown, first fitting 125 is fabricated as a monolith that includes body portion 139, motor attachment portions 147, fairing mounts 157, and stator locators 163. Stated differently, first fitting 125 may be fabricated from a single portion of material such that body portion 139, motor attachment portions 147, fairing mounts 157, and stator locators 163 are integral with one another. First fitting 125 further includes an actuator mount 169 that is configured to support attachment of an actuator (not shown) to first fitting 125. For example, a linear actuator configured to operate vanes 117 may be attached to actuator mount 169.

Figure 7:
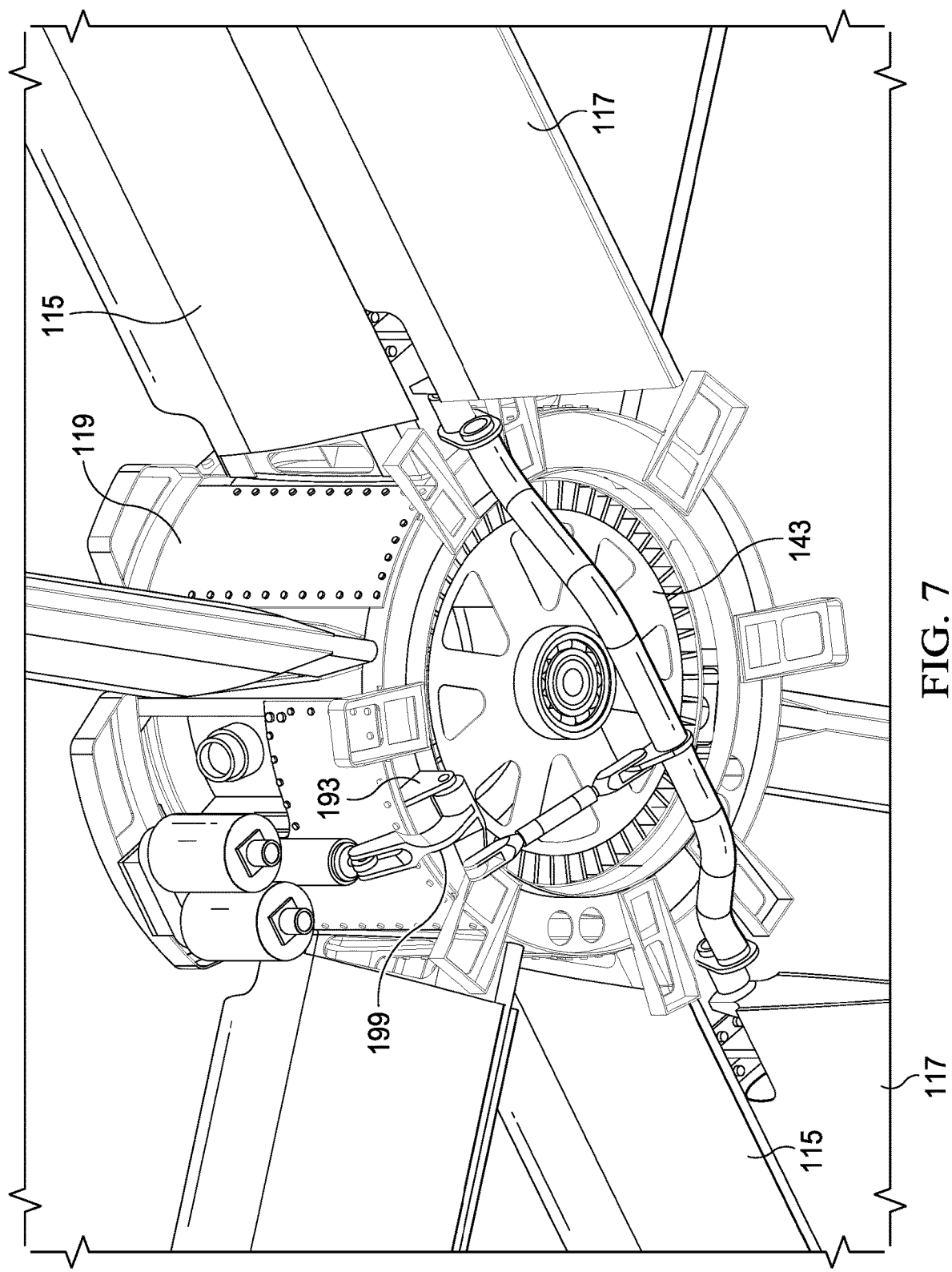
FIG. 7 is an oblique view of the underside of the hub assembly depicted in FIGS. 3A-3E, with the motor installed.

FIGS. 5A-5D illustrate various views of second fitting 127. Second fitting 127 includes a body portion 171 that defines an opening 173 that extends therethrough. Opening 173 is configured to expose a portion of motor 143, for example as depicted in FIG. 7. With continued reference to FIGS. 5A-5D, body portion 171 includes an annular plate 175, a circumferential inner wall 177 that extends downward from plate 175, and a circumferential outer wall 179 that extends downward from plate 175 around a perimeter of second fitting 127.

Second fitting 127 includes a plurality of fairing mounts 181. Fairing mounts 181 are configured to provide attachment of fairing 121 to hub assembly 119 that supplements respective attachment provided by ribs 159 of first fitting 125. Fairing mounts 181 comprise respective projections, in the form of ribs 183, that extend outward from an outer surface of outer wall 179. In this regard, fairing mounts 181 are supported by outer wall 179. Ribs 183 may be configured such that respective portions of fairing 121 can be attached to ribs 183. In this embodiment, each rib 183 defines an outer surface 185 that is configured to abut a corresponding portion of an inner surface of fairing 121, thereby providing an attachment surface for securing fairing 121 to hub assembly 119. It should be appreciated that in alternative embodiments, fairing mounts 181 can comprise ribs having different geometries as compared to ribs 183. It should further be appreciated that fairing mounts 181 are not limited to implementation as ribs and may be alternatively implemented to otherwise facilitate attachment of fairing 121 to second fitting 127.

Second fitting 127 further includes a plurality of stator attachment locations 187. Each of the illustrated stator attachment locations 187 is configured to locate the second end 133 of a respective stator support 129 for attachment to the hub assembly 119. As shown, each stator attachment location 187 defines a pair of apertures 189 that extend through plate 175. Each aperture 189 is configured to receive a fastener to attach the second end 133 of a corresponding stator support 129 to second fitting 127.

Second fitting 127 further includes a plurality of motor attachment points, in the form of apertures 191, that facilitate attachment of motor 143 to second fitting 127. Apertures 191 extend through plate 175, and each aperture 191 is configured to receive a fastener for securing motor 143 to second fitting 127.

Second fitting 127 may be fabricated from steel or any other suitable material. As shown, second fitting 127 is fabricated as a monolith that includes body portion 171 and fairing mounts 181. Stated differently, second fitting 127 may be fabricated from a single portion of material such that body portion 171 and fairing mounts 181 are integral with one another. Second fitting 127 further includes a crank mount 193 that is configured to support attachment of a bell crank to second fitting 127. For example, as seen in FIG. 7, a bell crank 199 configured to operate linkages that in turn cause vanes 117 to rotate may be attached to crank mount 193.

FIGS. 6A-6B are oblique views illustrating installation of motor 143 into hub assembly 119. Motor 143 includes a plurality of attachment lugs that are configured to facilitate attachment of motor 143 to hub assembly 119. As shown, motor 143 includes six upper lugs 195 spaced apart from each other circumferentially about an upper end of motor 143, and further includes six lower lugs 197 spaced apart from each other circumferentially about a lower end of motor 143. Each upper lug 195 and lower lug 197 defines a respective aperture that extends therethrough and that is configured to receive a fastener.

In an example process of installing motor 143 into hub assembly 119, each lower lug 197 is aligned with a corresponding keyed gap 155 and motor 143 is disposed into opening 141 such that lower lugs 197 pass through keyed gaps 155. After lower lugs 197 have passed beyond first fitting 125, motor 143 is rotated such that the aperture in each upper lug 195 aligns with aperture 151 in a corresponding tab 149 of first fitting 125 and the aperture in each lower lug 197 aligns with a corresponding aperture 191 in plate 175 of second fitting 127. Motor 143 is then seated in position within hub assembly 119 such that upper lugs 195 abut tabs 149 and lower lugs 197 abut plate 175, as shown in FIG. 6B. With motor 143 in this seated position, fasteners are installed to secure motor 143 to first and second fittings 125, 127 respectively, thereby attaching motor 143 to hub assembly 119.

It should be appreciated that a hub assembly as described herein may be suitable for deployment in aircraft having other configurations, for example in fixed (non-pivotable) ducted-rotor aircraft, in turbofan engines, or the like.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A fitting for a hub of a ducted-rotor aircraft, the fitting comprising:
    a body portion that defines an opening that extends therethrough, the opening configured to receive a motor of the ducted-rotor aircraft;
    a plurality of motor attachment portions that are configured to locate and support the motor;
    a plurality of fairing mounts that are configured to support attachment of an aerodynamic fairing to the hub; and
    a plurality of stator locators, each stator locator configured to locate a respective stator support for attachment to the hub.

2. The fitting of claim 1, wherein the body portion includes a wall that supports the plurality of motor attachment portions, the plurality of fairing mounts, and the plurality of stator locators.

3. The fitting of claim 2, wherein each of the plurality of motor attachment portions comprises a respective protrusion that extends into the opening from the wall.

4. The fitting of claim 3, wherein each respective protrusion comprises a tab having an aperture that extends therethrough, the aperture configured to receive a fastener.

5. The fitting of claim 4, wherein the tabs define keyed gaps therebetween, the keyed gaps configured to facilitate insertion of the motor into the hub.

6. The fitting of claim 2, wherein each of the plurality of fairing mounts comprises a respective projection that extends outward from an outer surface of the wall.

7. The fitting of claim 6, wherein each projection comprises a rib that defines an arc-shaped outer surface that is configured to abut an inner surface of the fairing.

8. The fitting of claim 2, wherein each of the plurality of stator locators comprises a recess that extends into an outer surface of the wall.

9. The fitting of claim 2, wherein the wall is annular.

10. The fitting of claim 1, further comprising an actuator mount that is configured to support attachment of an actuator to the fitting.

11. A fitting for a hub of a ducted-rotor aircraft, the fitting configured to:
- align a motor of the ducted-rotor aircraft during attachment of the motor to the hub;
- structurally support attachment of an aerodynamic fairing to the hub; and
- locate respective positions for each of a plurality of stator supports during attachment of the stator supports to the hub.

12. The fitting of claim 11, wherein the fitting comprises a plurality of motor attachment tabs that are configured to align the motor, and
wherein the motor attachment tabs are integral with a body portion of the fitting and extend into an opening defined by the body portion.

13. The fitting of claim 12, wherein the fitting further comprises a plurality of arc-shaped ribs that are configured to abut an inner surface of the fairing, and
wherein the ribs are integral with the body portion of the fitting and extend from an outer surface of the body portion.

14. The fitting of claim 13, wherein the fitting further comprises a plurality of recesses, each recess configured to locate a position of a respective stator support, and
wherein the recesses extend into the outer surface of the wall of the body portion.

15. The fitting of claim 11, the fitting further configured to:
support attachment of an actuator to the fitting.

16. A hub assembly for a ducted-rotor aircraft, the hub assembly comprising:
- a plurality of stator supports, each stator support defining a first end and an opposed second end, each stator support configured to facilitate attachment of a stator to the hub assembly;
- a first fitting that is configured for attachment to the first ends of the plurality of stator supports; and
- a second fitting that is configured for attachment to the second ends of the plurality of stator supports.

17. The hub assembly of claim 16, wherein the first fitting comprises:
- a first body portion that partially defines an opening configured to receive a motor of the ducted-rotor aircraft;
- a plurality of motor attachment portions that are configured to locate and support the motor;
- a first plurality of fairing mounts that are configured to support attachment of an aerodynamic fairing to the hub assembly; and
- a plurality of stator locators, each stator locator configured to locate the first end of a respective one of the plurality of stator supports for attachment to the first fitting.

18. The hub assembly of claim 17, wherein the first fitting further comprises an actuator mount that is configured to support attachment of an actuator to the first fitting.

19. The hub assembly of claim 17, wherein the second fitting comprises:
- a second body portion that defines a second opening, the second opening configured to expose a portion of the motor;
- a second plurality of fairing mounts that are configured to further support attachment of the fairing to the hub assembly; and
- a plurality of stator attachment locations, each location configured to facilitate attachment of the second end of a respective one of the plurality of stator supports to the second fitting.

20. The hub assembly of claim 19, wherein the second fitting further comprises a mount that is configured to support attachment of a bell crank to the second fitting.

* * * * *